April 12, 1932.     O. C. BROWNE     1,854,101
TWIN HEAD LAMPS
Filed Aug. 11, 1930     2 Sheets-Sheet 1

Orville C. Browne,
INVENTOR

BY Victor J. Evans
ATTORNEY

April 12, 1932.　　　O. C. BROWNE　　　1,854,101
TWIN HEAD LAMPS
Filed Aug. 11, 1930　　2 Sheets-Sheet 2
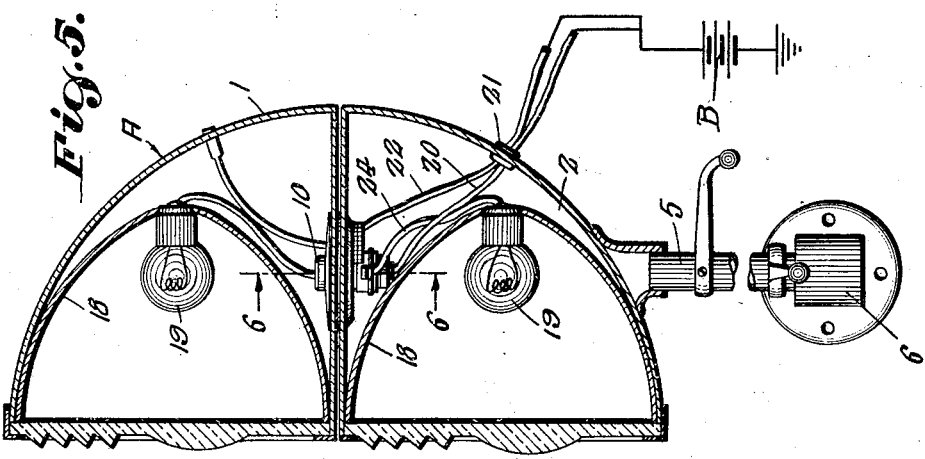
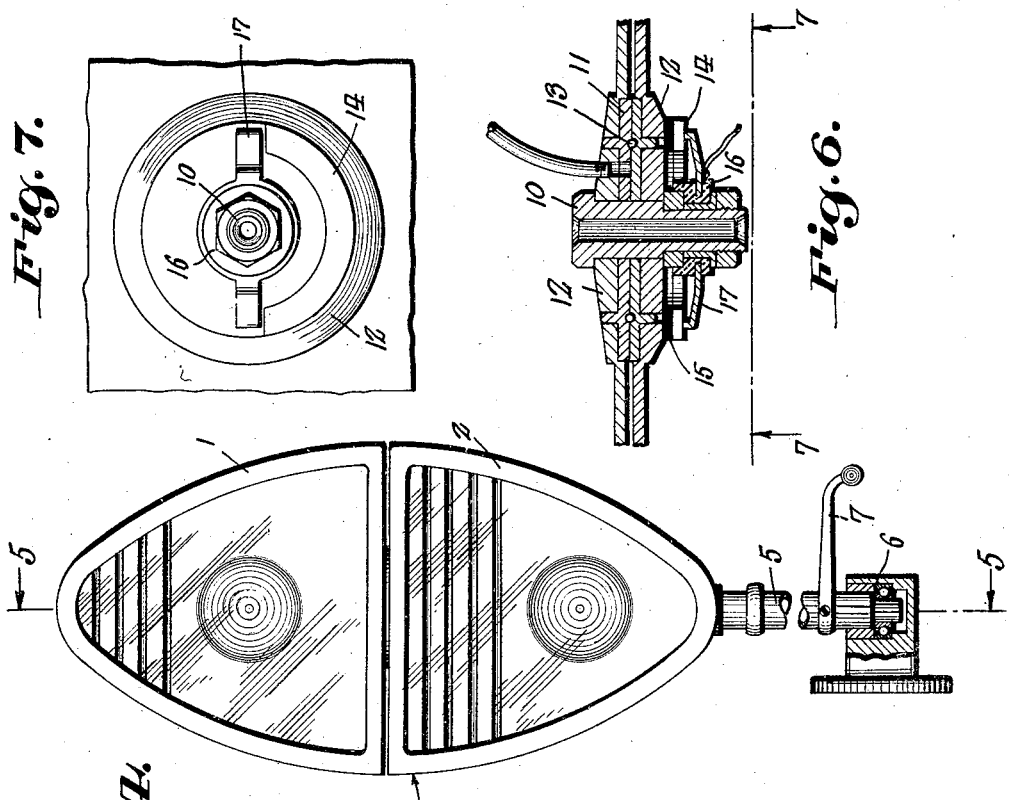
Orville C. Browne,
INVENTOR
BY Victor J. Evans
ATTORNEY Patented Apr. 12, 1932

1,854,101

UNITED STATES PATENT OFFICE

ORVILLE C. BROWNE, OF SAN BERNARDINO, CALIFORNIA

TWIN HEAD LAMPS

Application filed August 11, 1930. Serial No. 474,502.

This invention relates to twin lamps mainly designed for use as a headlamp for a motor vehicle, but which, of course, can be used for other purposes, the general object of the invention being to provide a lamp formed of two sections, the sections being so shaped as to give the lamp the appearance of an ordinary lamp, with means for moving one section by the steering mechanism of the vehicle so that the rays of this movable section will illuminate the road on curves and turns.

A further object of the invention is to provide switch means for the circuit of the lamp of the movable section whereby the circuit will be broken until the section is moved by the steering mechanism as the car rounds a curve or turn.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 4 is a front view of one of the headlamps, with the bearing means in section.

Figure 5 is a section on line 5—5 of Figure 4.

Figure 6 is a section on line 6—6 of Figure 5.

Figure 7 is a section on line 7—7 of Figure 6.

As shown in these views, each headlamp A is composed of the upper and lower sections 1 and 2, these sections being so shaped as to form the front of the lamp of substantially oval shape and the adjacent parts of the sections being flat so that they can be placed close together. The upper section is connected by a bracket 3 of any suitable shape to a front of the fender and the upper sections of the two lamps may be connected together by a cross bar 4 so that said sections are held against movement.

Figure 1:
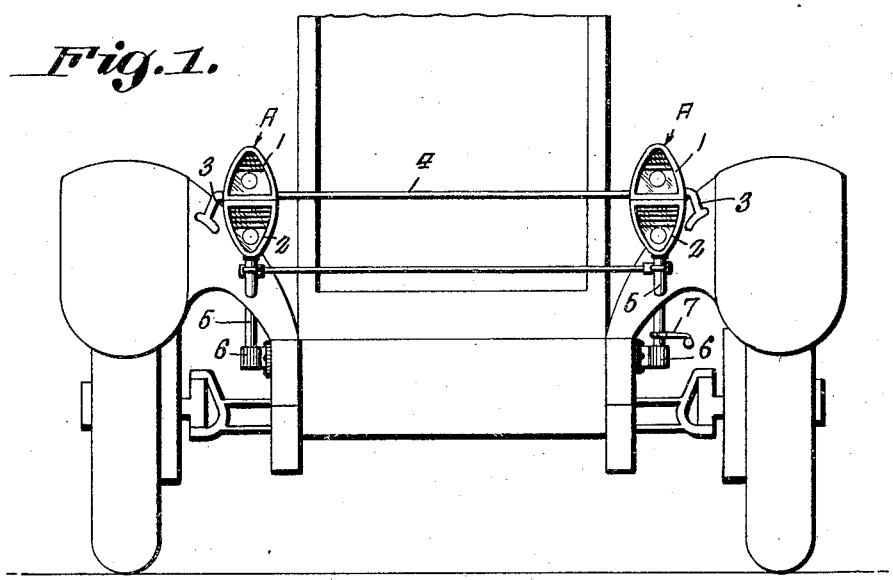
Figure 1 is a front view of a motor vehicle equipped with this invention.
Figure 2:
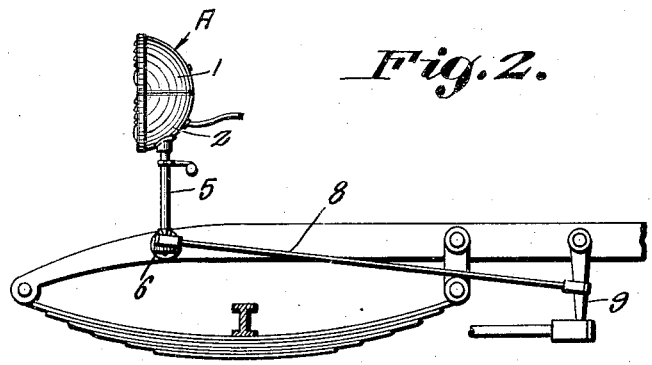
Figure 2 is a detail side view showing how the movable section is operated from the steering mechanism of the vehicle.
Figure 3:
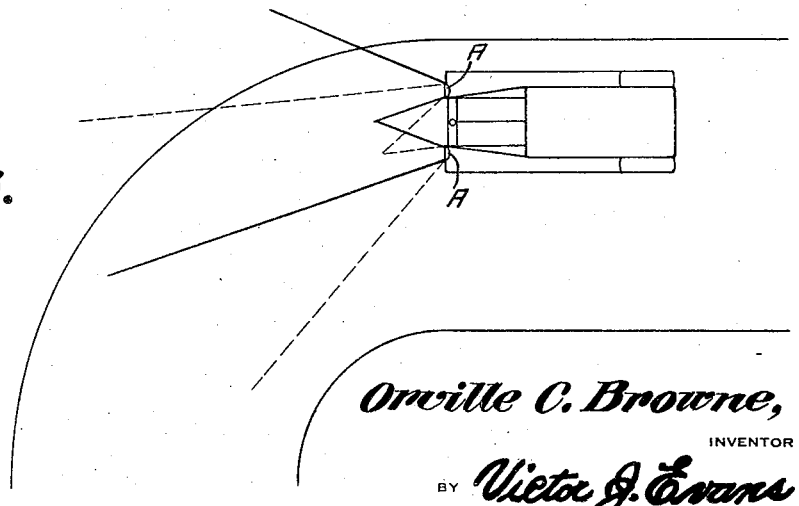
Figure 3 is a diagrammatic view showing how the light rays from the movable sections illuminate a turn in a road.

A vertically arranged shaft 5 is supported for rotary movement in a front part of the vehicle and is connected with the lower part of the bottom section 2. The lower end of each shaft 5 is supported by the anti-friction means shown generally at 6. An arm 7 is connected with each shaft and this arm is connected by a link 8 with the part 9 of the steering mechanism of the vehicle so that the lower sections of the lamps will be turned when the steering mechanism is operated to turn the front wheels of the vehicle to cause the vehicle to make a turn or take a curve in the road. Thus the rays of light from the lamps in the lower sections will illuminate the curved part of the road, as shown in dotted lines in Figure 3, while the rays of light from the upper section will pass straight ahead, as shown in full lines in Figure 3.

The bottom of the upper section and the top of the lower section are connected together by a tubular bolt 10 which passes through these parts and through plates 11 placed in recesses in the enlarged parts 12 of the central portions of the adjacent parts of the sections and through which the bolt passes. Anti-friction means 13 are placed between the plates to reduce friction. A substantially semi-circular contact member 14 is carried by the lower face of the enlargement 12 of the top of the lower section, this member being insulated from the lower section, as shown at 15. A collar 16 of insulating material is carried by the lower part of the bolt and wiper arms 17 are carried by this collar for engaging the contact member 14 when the lower section is turned. When the lower section is in alignment with the upper section, the brush arms do not engage the contact member, so that the circuit is broken. Of course, each section carries a reflector 18 and a bulb 19 and a conductor 20 leads from the battery B or other source of supply through an opening 21 in the lower section at the rear thereof and through the bolt and is connected with the bulb of the top section. Another conductor 22 connects the member 14 with the battery and a conductor 24 connects a brush arm 17 with the bulb of the lower section so that when the arm is in contact with the member 14, current will flow to the lower bulb 19.

From the foregoing it will be seen that the two sections of the lamp are so shaped as to make the lamp look as if it is of the usual construction, with means for moving the lower section when the front wheels of the vehicle are turned so that the rays of light from the lower sections of the lamps will illuminate the road as the vehicle is taking a curve, with means for breaking the circuit of the bulbs of the lower sections when the car is traveling straight ahead. However, if desired, the switch means can be omitted so that the bulbs of the lower sections will be lighted at all times while the main switch of the lighting system is on.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A lamp of the class described comprising superposed pivotally connected casings forming independent lamp chambers adapted when in matched relation one to the other for outlining a single body, and means for supporting one casing stationary, the other casing being movable in a horizontal path relative to the stationary casing.

2. A lamp of the class described comprising superposed pivotally connected casings forming independent lamp chambers adapted when in matched relation one to the other for outlining a single body, means for supporting one casing stationary, the other casing being movable in a horizontal path relative to the stationary casing, and means for illuminating the casing, one illuminating means being constant and the other intermittent.

3. A lamp of the class described comprising superposed pivotally connected casings forming independent lamp chambers adapted when in matched relation one to the other for outlining a single body, means for supporting one casing stationary, the other casing being movable in a horizontal path relative to the stationary casing, and means for illuminating the casing, one illuminating means being constant and the other intermittent and automatically controlled.

4. The combination of superposed substantially semi-oval shaped casings forming independent lamp chambers and adapted to match each other when in vertical alignment to present a complete substantially oval-shaped lamp body formation, a pivotal connection between the casings to permit relative horizontal swinging movement of one casing with respect to the other, illuminating means within the casing, and a switch operative at the pivotal connection and controllable by movement of one casing to regulate the illuminating means within said movable casing to render it intermittent.

In testimony whereof I affix my signature.

ORVILLE C. BROWNE.